United States Patent [19]
Gunn

[11] 4,117,975
[45] Oct. 3, 1978

[54] MAIL PREPARATION, SORTING APPARATUS AND METHOD

[76] Inventor: Damon M. Gunn, 4007 49th St., NW., Washington, D.C. 20016

[21] Appl. No.: 658,799

[22] Filed: Feb. 17, 1976

Related U.S. Application Data

[62] Division of Ser. No. 158,187, Jun. 30, 1971, abandoned.

[51] Int. Cl.[2] ........................ G06K 19/08; B23K 9/10; G06K 7/14

[52] U.S. Cl. .................................... 235/494; 209/584; 235/375

[58] Field of Search ................. 235/61.12 R, 61.12 N, 235/61.11 E, 61.11 R, 61.11 D, 61.12 M, 61.9 A, 151.33; 209/DIG. 1, 111.7, 11.5; 250/568, 569; 340/149 A

[56] References Cited

U.S. PATENT DOCUMENTS

| | | | |
|---|---|---|---|
| 3,414,731 | 12/1968 | Sperry | 235/61.11 E |
| 3,578,953 | 5/1971 | Milford | 235/61.12 M |
| 3,635,297 | 1/1972 | Salava | 235/151.33 |
| 3,712,973 | 1/1973 | Karl | 235/61.11 R |
| 3,757,942 | 9/1973 | Gunn | 209/11.5 |
| 3,760,164 | 9/1973 | Kral | 235/61.12 N |
| 3,774,758 | 11/1973 | Sternberg | 209/111.7 |
| 3,783,246 | 1/1974 | Bayer | 235/61.12 R |
| 3,790,757 | 2/1974 | Shaw | 235/61.12 R |
| 3,801,775 | 4/1974 | Acker | 235/61.11 E |
| 3,852,573 | 12/1974 | Polch | 235/61.11 E |
| 3,889,103 | 6/1975 | Russell | 235/61.9 A |
| 3,890,488 | 6/1975 | Lee | 235/61.9 A |

FOREIGN PATENT DOCUMENTS

| | | | |
|---|---|---|---|
| 1,252,108 | 11/1971 | United Kingdom | 235/61.12 N |

*Primary Examiner*—Robert M. Kilgore
*Attorney, Agent, or Firm*—Jim Zegeer

[57] ABSTRACT

There is disclosed apparatus for marking and then sorting of articles by code or address marks which bear the identifying marks in a grid or code area locateable by one or more guide elements which may be separate and distinct from the marked code. More particularly, this apparatus and method is directed towards the preparation and sorting of bulk mail including the referencing of the written address as well as the code markings to the guide elements. Before passing the reading station, the articles are turned to use the customary location of stamps to minimize the movement of the optical train reading the identifying marks or a mirror, reflecting said marks to the reader, the movement of the mirror or optical train being synchronized to the movement of the guide elements to give the reader a more continuing image while nearly stationary.

12 Claims, 4 Drawing Figures

MAIL PREPARATION, SORTING APPARATUS AND METHOD

This is a division of application Ser. No. 158,187, filed June 30, 1971.

BACKGROUND AND BRIEF DESCRIPTION OF THE INVENTION

The present invention is directed particularly to apparatus and method for the machine preparation of addresses and mechanical sorting of bulk mail. Wrinkling and crushing of letters, careless placing of addresses with irrelevant markings makes the present machine location thereof undependable. This invention locates machine written addressee codes (ZIP Codes and/or coded local telephone number of addressee) and street address preferably independent of the edges of the mail, it being understood that certain novel features, such as use of coded addressee telephone numbers, may be incorporated in conventional sorting and mail delivery systems. These are further improvements on my application for patent, Ser. No. 91,701, for Article Sorting Apparatus and Method filed on Nov. 23, 1970 and my application for patent, Ser. No. 107,421 for Postal Apparatus Method filed Jan. 18, 1971 and are incorporated herein by reference.

Background material disclosing the magnitude of the problem of preparing and sorting of mail is contained in many publications of the Postal Service such as, "Memorandum to Industry on Postal Means" by H. M. Faught, Assistant Postmaster General, 1970 and the "Proceedings of the U.S. Postal Service Invitation to Industry", 1970.

There are a large number of prior art disclosures and apparatus presently available which may have similar objectives and are referenced in my earlier applications.

There are also a number of prior art systems for addressing of bulk mail and the sorting thereof including as disclosed Pine patent: U.S. Pat. No. 3,520,404 as well as those referenced in my earlier applications. However, the prior art does not provide for means for readily locating the markings for the address on the envelope or package as provided in this invention. The principal object of this invention is to furnish an economical means for a bulk mailer to prepare his mail so that the Postal Service can quickly, easily, and accurately sort it mechanically with a saving of labor. While the present invention is directed towards a method and apparatus for the addressing and sorting, it will be apparent that several features to be described later in detail can be used to the advantage in other sorting systems.

In a highly preferred form, the invention contemplates a postage stamp or other member having an adhesive on one surface or other means of affixing (printing, for example) same to an article to be sorted as described in my earlier application for patent, Ser. No. 91,701 for Article Sorting Apparatus and Method filed on Nov. 23, 1970. This invention contemplates the making a larger surface on the stamp to carry the name and street and, as well as the coded telephone number of the addressee and a coded ZIP Code which can be entered more accurately by bulk mailing apparatus, so that the stamp actually becomes a complete machine readable Stamp-Label. While the earlier invention was directed to economically bridging the gap between machine sorting of articles and manually addressing of same, the present invention is addressed as well to the mechanical placing of the markings for addressing a Stamp-Label on bulk mail and sorting Letters not only at the incoming post office but at the addressee's post office. It then becomes a computerized letter sequencer facilitating the arrangement of the letters for distribution by respective letter carriers.

The street address, the coded telephone number, and the markings for the ZIP Code are all placed on the Stamp-Label and referenced to the location of the stamp guide markings of the differently sensed material. One of the guide markings may be a horizontal line or bar upon or about which the street address of the addressee is printed or prepared by the postage meter combined with addressing mechanism or by writing as on a stamped envelope, so that the identification of the street address is that more accurate.

An apparatus for accurate printing of the code markings along with a code guide for metered postage is shown in FIG. 4 of my application Ser. No. 91,701 for Article Sorting Apparatus and Method filed Nov. 23, 1970. This includes apparatus for referencing to the code guide and is improved by adding thereto a postage meter if needed as well as a typing or printing mechanism which is activated either by electronic tape, banks of typed addresses, or addresses prepared by xerography from previously prepared addresses or other means known in the art to print the material on the Stamp-Label. The critical point is that the address, street and ZIP Code and code telephone number, however entered on the Stamp-Label is referenced to the code guide so as to be easily read optically, translateable into electronic signals, e.g., binary electronic language connected to memory banks or data base carrying said numbers and address marks. In place of or in conjunction with the street address, the telephone number of the addressee might be used either in code or printed form.

In place of, or in conjunction with the street address the telephone number of the addressee with ZIP Code can be used either in code or in printed form to obtain the printing thereof by electronic pulses triggered by the sending the electronic signals of the telephone number with ZIP Code, to a data base carrying the numbers and address in a computerized memory bank. This data base for the addresses as referenced to the telephone numbers, already exist in many local computerized telephone offices. It is used for monthly billings. Having the addresses referenced to the respective telephone numbers permits complete addressing to be accomplished by giving the data base the electronic signals for the respective telephone number. The data base in turn provides electronic signals to a tape-controlled electronic typewriter, which can place the address in any desired form including machine readable code on the code label and be referenced to the stamp guide.

The apparatus which prints the address has a mechanism which keys the location of the code guide to the place where the address code markings are printed. If the address is placed on a metered Stamp-Label, the metering device must also, of course, print or be sensitive to a pre-printed mark acting as a code guide which is in the material upon which the address marks are placed. If there is any fault in the code guide material or in the pre-printed Stamp-Label or the pre-printed envelope, a safety device stops the operation.

When the bulk mail goes to the incoming post office, the mail is sorted for initial distribution by referring to the coded ZIP Code as marked on the Stamp-Label. An apparatus for accomplishing this has been disclosed in my application for patent, Ser. No. 91,701 of Nov. 23, 1970. An improvement of this apparatus is the use of a moveable reflector or optical system with movement synchronized to reflect the code markings from the Stamp-Label, all being synchronized to the movement or location or orientation of the code guide in the Stamp-Label so as to give the optical reader a period of reading rather than one resulting from a stopping of the movement of a certain sized letter of certain color past the optical reader as is presently necessary.

The code guide can be of material which in addition to being a means for locating the marks which constitute the address, can be a triggering or activating means, or controlling apparatus for the optical train for picking up, orienting, and carrying a mail piece for transportation for other servicing. Also to improve the performance of the scanning reader, in place of having the letter turned to place the Stamp-Label at the bottom of the letter as it is read, it can be turned so that the letter goes through the reader with the street address markings in a so-to-speak vertical, or more accurately stated, in a line which is at right angles to the direction of motion of the letter as it is read to get the greatest uniformity of location of the Stamp-Label as placed by the customers.

As the letter reaches the post office of the addressee's ZIP Code, it is then passed through a reader sorter mechanism which in turn reads the code markings indicating the street address or telephone number of the addressee and produces an electrical output signals corresponding to the referred markings. The output of the scanner reader, in turn, may be stored electronically in a memory bank or communicated to a data bank connected and coordinated with servo-mechanisms to levers for directing the article to be discharged in receptacles or places which have been determined to be in order for various sequenced delivery boxes for the proper route mailmen. Thus, the apparatus becomes a reliable computerized letter sequencer.

A useable data bank is often in existence in the local telephone office as it is used for the telephone company's local billings. In many foreign countries the telephone and postal service are unified which facilitates the coordination.

BRIEF DESCRIPTION OF THE DRAWINGS

The above and other features and advantages of the invention will become more apparent from the following specification taken in conjunction with the accompanying drawings wherein:

FIG. 1 illustrates a Stamp-Label 10, carrying a code grid 11 for ZIP Code and 11*a* for telephone number, on its upper surface having conventional adhesive not shown on the reverse surface for adhering same to an envelope 12, for example.

Figure 1:
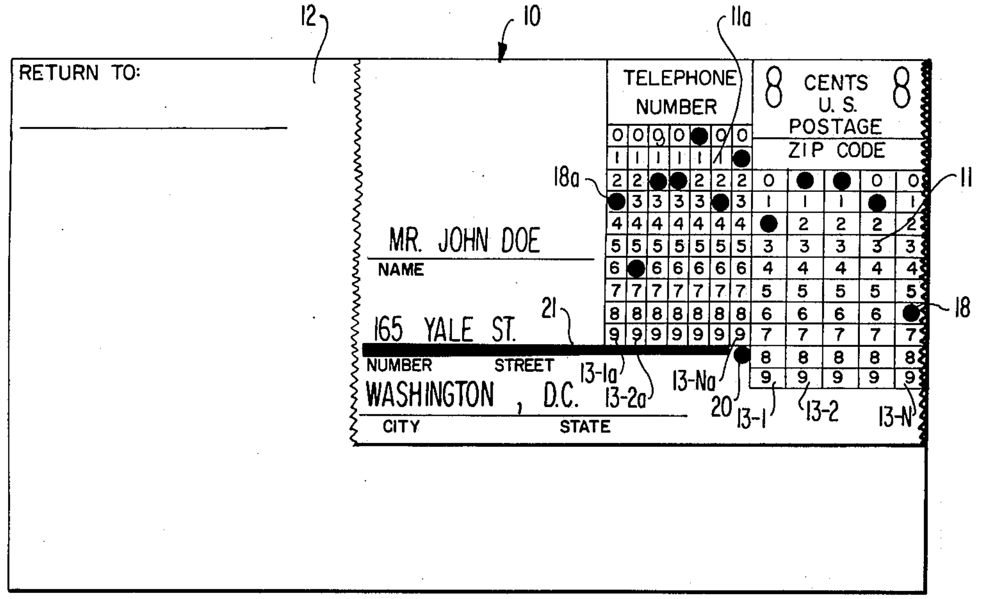
FIG. 1 illustrates the postage stamp affixed to an article as an envelope with a code area for telephone number in addition to the ZIP Code.

Code grid 11 and 11*a*, comprise a plurality of vertical columns 13.1, 13.2 . . . 13.*n* which embodiment shown, have 10 blocks each for the numerals 0–9 and are in sequence. Code grid 11 has intricately associated therewith, a pair of code guide locating elements 20 and 21 constituted by a circle and an elongated, heavy tapered line 21 upon which these elements may be magnetic, fluorescent, or electrically conductive, but is different from material used for the code mark 18.

The material of the elements 20 and 21, is optically different and detectable by a device which ignores the other markings, and they are definitely locateable as a reference point for reading the other information on the Stamp-Label. This is further described on page 5 of my application Ser. No. 91,701 for patent for Article Sorting Apparatus and Method filed Nov. 23, 1970. One of the guide elements may be a tapered line upon which the street address may be printed. This makes the printing of the street address on the stamp guide 21 element to give a better registration thereof.

Figure 2:
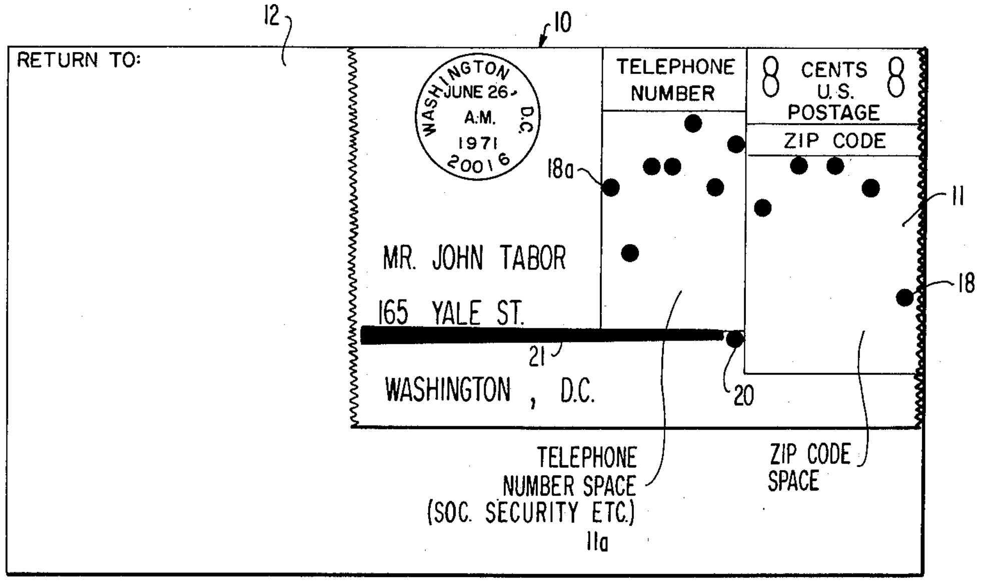
FIG. 2 illustrates an envelope with a coded telephone address and a coded ZIP Code as prepared by a bulk mail printing apparatus.

FIG. 2 illustrates another form of the Stamp-Label 10 carrying the machine-made code markings for the ZIP Code and telephone code markings 18 and 18*a*. The street address is also written on a guide mark 21.

Figure 3:
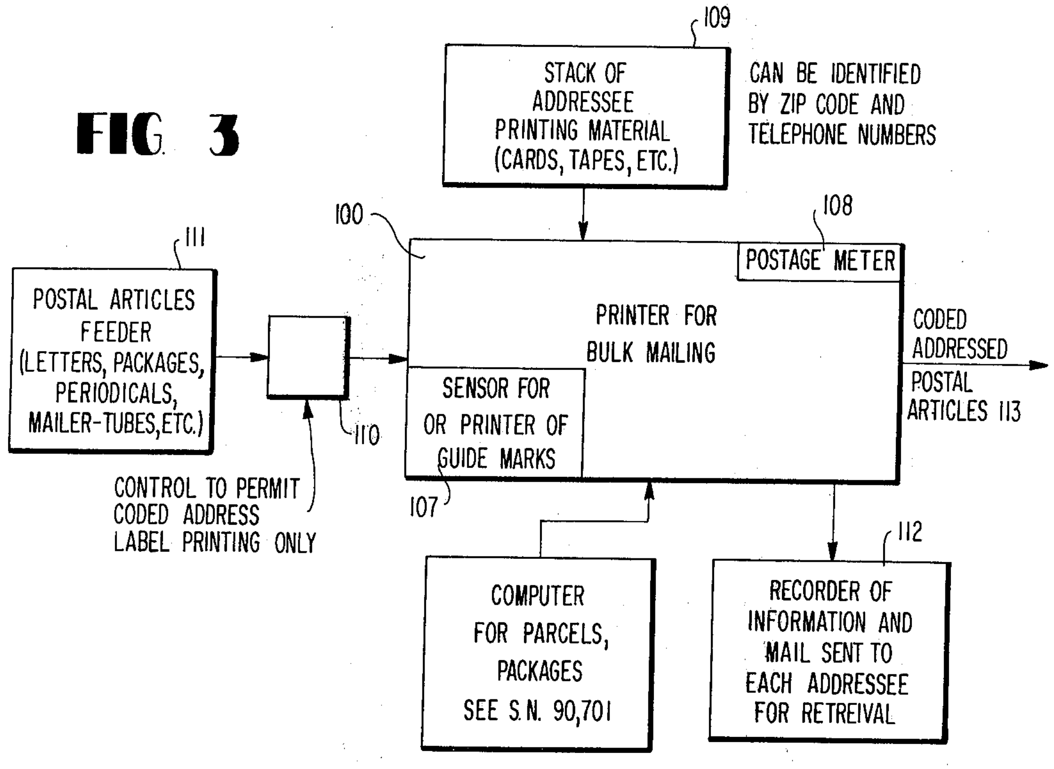
FIG. 3 is a block diagram of the apparatus incorporating my invention for printing the Stamp-Label illustrated in FIG. 2.

FIG. 3 represents a diagrammatical drawing illustrating the printer for this machanically prepared bulk mail Stamp-Label. This printer 100 has within it either a sensor for locating the guide elements 20 and 21 or a means for printing 107 said guide elements with a distinctively recognizable marking. There is also attached to the printer a postage meter 108 which records the amount of postage used. Connected with the printer is a stack of addressee printing material 109 in the form of cards, electronic tape, banks of typed addresses or addresses prepared by xerography or other means known in the art for acitvating the printing of addresses on the Stamp-Label. These addresses can be each identified by a multidigit number which is unique in its class to the particular addressee. Such number may be selected from one of the group comprising the addressee's telephone number, credit card number, checking account number or the like unique number, and preferably such number is also correlated with the ZIP Code of the addressee so that the entering of the telephone numbers (for example) and ZIP Code activates the machine printing of the whole address in code or alphanumeric form. For other purposes the entrance of a number such as Social Security number can produce relevant data for the person so identified. In fact in addition to delivery of postal articles, the entrance of any relevant unique addressee number may be read and stored for future retrieval of data pertaining to that addressee, postal articles delivered thereto, etc., in memory bank 112.

The printer 100 using the sensor apparatus 107 for the material which reacts to the stamp guides 20 and 21 places the address and stamp markings according to the proper location for said code or it prints the material for the stamp guides and references the markings for the address to the location of the stamp guides on the articles stored for feding 11 and it discharges them at 113. This printer 100 of the bulk mailing, by changing the control 110, can print coded addresses by furnishing the ZIP Code number plus the telephone number of the addressee.

Figure 4:
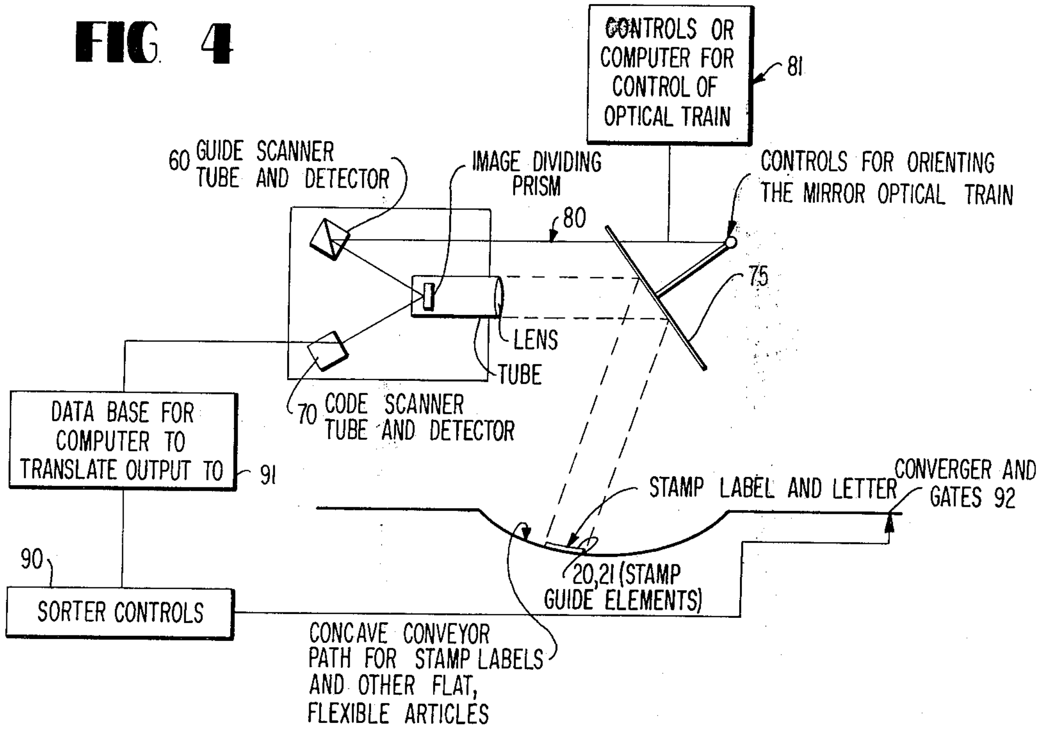
FIG. 4 is a block diagram of apparatus for reading on a Stamp-Label the sorting information needed, using an optical system adjustable and synchronized to the movement and position of the stamp guide.

FIG. 4 represents an improvement in the apparatus for locating the stamp guide and reading the address as written. A mirror or optical train 75 is controlled by targeting device 81, its movement being synchronized to the movement and location or orientation of the guides 20, 21 in the Stamp-Label so that the optical reader 60 has a period for reading rather than one resulting from the stoppage of the movement of the letter with the Stamp-Label past the optical reader. The movements of the optical train 75 and the reader 70 are controlled by signals from the computer 81 activated by the signals from the scanner 60. The control of the movement of the optical train is converyed through a circuit 80. Train 75 is controlled to bring the image of the Code areas (see FIGS. 1 and 2) 11 and 11*a* onto scanner 70. The ZIP Code and the code telephone numbers are so read by scanner 70 as to make the output translateable from the optical scanner or reader into electronic signals, e.g. binary electronic language connected to sorter control bands 90 or data carrying base, carrying said output number and address marks to switches and gates 92 which sill open the proper channel as the article moves down the line.

I claim:

1. An address label adapted to be placed on an article to facilitate automatic sorting and distribution of the article, said label comprising:

(a) a distinctive guide mark adapted to be recognized by an automatic reading device;

(b) a plurality of machine-readable code marks, the position of said code marks in relation to said guide mark being indicative of the location of the addressee; and (c) a line of machine-readable characters comprising the plain-language street address of the addressee, said line being in a fixed predetermined position in relation to said guide mark.

2. An address label adapted to be placed on an article to facilitate automatic sorting and distribution of the article, said label comprising:

(a) a distinctive guide mark adapted to be recognized by an automatic reading device;

(b) a plurality of machine-readable code marks, the position of said code marks in relation to said guide mark representing a number that is distinctive of the particular address or addressee, said number being automatically convertible to street address information by means of a memory bank in which distinctive numbers are stored together with corresponding stress addresses.

3. An address label in accordance with claim 2 in which said second set of code marks represents the telephone number of the addressee.

4. An address label in accordance with claim 1, wherein said guide mark is of a meterial sensed difficulty from the other marks on said label.

5. An address label in accordance with claim 2, wherein said guide mark is of a material sensed differently from the other marks on said label.

6. A plurality of addressee records, each of said records having at least one marking selected from the group consisting:

(1) A multidigit number unique in its class to said addressee, in machine-readable form, whereby the said unique number after machine reading may be automatically converted to address information by means of a memory bank in which are stored said unique numbers, together with corresponding address information;

(2) the addressee's ZIP Code in the machine-readable form of a plurality of code marks each of which, by its position in relation to a rectangular grid scheme bearing a uniform relation to a distinctive machine-readable guide mark, indicates one digit of the ZIP Code; and (3) the addressee's street address in machine-readable plain language positioned in a uniform fixed relation to a distinctive machine readable guide mark.

7. The invention according to claim 6, each of said records having at least two markings selected from the indicated group.

8. The invention according to claim 6, each of said records having markings of all three members of the indicated group.

9. Apparatus for applying postage and machine-readable addresses to articles for mailing, comprising:

(a) a plurality of address records according to claim 6;

(b) first means for holding said address records;

(c) a postage meter;

(d) a tape reservoir;

(e) a printer;

(f) second means for transferring an address plate from said first means to said printer;

(g) third means for causing the data on said address plate to be printed on a length of tape from said tape reservoir; and (h) fourth means for causing said postage meter to print postage indicia on the same length of tape.

10. Apparatus according to claim 8 wherein said third means comprises;

(a) fifth means for causing all data on said plate except said distinctive guide mark to be printed in a common visually readable and machine readable ink; and (b) sixth means for causing said distinctive guide mark to be printed in an ink having a charateristic that is sensed differently from said common ink and from other inks and markings normally present on postal articles.

11. Apparatus according to claim 9 in combination with means for cutting of said length of tape and affixing it to an article to be mailed.

12. The invention defined in claim 6 wherein said multidigit numbers unique in its class is selected from one or more of the group including:

(1) the addressee's telephone number (2) the addressee's Social Security number (3) the addressee's military serial number (4) the addressee's driver's license number (5) the addressee's credit card number (6) the addressee's checking account number.

* * * * *